(12) United States Patent
Kussmaul et al.

(10) Patent No.: US 11,176,134 B2
(45) Date of Patent: Nov. 16, 2021

(54) NAVIGATION PATHS BETWEEN CONTENT ITEMS

(71) Applicant: International Business Machines Corporation, Armonk, NY (US)

(72) Inventors: Timo Kussmaul, Boeblingen (DE); Uwe K. Hansmann, Tuebingen (DE); Kai Brennenstuhl, Boeblingen (DE); Andreas Prokoph, Boeblingen (DE); Thomas Steinheber, Maihingen (DE)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 16/384,977

(22) Filed: Apr. 16, 2019

(65) Prior Publication Data
US 2020/0334256 A1    Oct. 22, 2020

(51) Int. Cl.
*G06F 16/2453* (2019.01)
*G06F 16/248* (2019.01)

(52) U.S. Cl.
CPC ...... *G06F 16/24542* (2019.01); *G06F 16/248* (2019.01); *G06F 16/24535* (2019.01)

(58) Field of Classification Search
CPC ......... G06F 16/24542; G06F 16/24535; G06F 16/248
See application file for complete search history.

(56) References Cited

U.S. PATENT DOCUMENTS

| | | | |
|---|---|---|---|
| 7,689,580 B2 | 3/2010 | Wang | |
| 7,895,181 B2 | 2/2011 | Shaw | |
| 8,244,749 B1 * | 8/2012 | Das | ......... G06F 16/90324 707/765 |

(Continued)

FOREIGN PATENT DOCUMENTS

| | | |
|---|---|---|
| JP | 2004112318 A | 4/2004 |
| JP | 4042100 B2 | 2/2008 |
| WO | 0119017 A1 | 3/2001 |

OTHER PUBLICATIONS

"Amazon Cloudsearch", 7 pages, Jul. 3, 2018, copyright 2018, Amazon Web Services, <https://aws.amazon.com/cloudsearch/>.

(Continued)

*Primary Examiner* — Andrew T Chiusano
(74) *Attorney, Agent, or Firm* — Alexander G. Jochym

(57) ABSTRACT

The invention relates to a method for automatically implementing one or more improved navigation paths between content items provided by a content management system. The content management system comprises a search service with a search monitoring component configured for monitoring search queries issued by a client application and for determining navigation paths used by a user of the client application for navigating between content items searched for by the monitored first search queries. The search service further comprises a navigation optimization component configured for determining improved navigation paths using the navigation paths determined by the search monitoring component. The navigation optimization component creates additional navigations which directly link a start content item and a target content item. The additional navigation path is assigned to be provided to the client application for display as part of a search query result.

15 Claims, 8 Drawing Sheets

(56) References Cited

U.S. PATENT DOCUMENTS

| | | | | |
|---|---|---|---|---|
| 8,316,019 | B1* | 11/2012 | Ainslie | G06F 16/90324 |
| | | | | 707/733 |
| 8,793,573 | B2 | 7/2014 | Beckmann | |
| 8,832,076 | B2 | 9/2014 | Gutlapalli | |
| 9,098,497 | B1 | 8/2015 | Brette | |
| 9,213,749 | B1 | 12/2015 | Collins | |
| 9,361,317 | B2 | 6/2016 | Lightner | |
| 9,563,621 | B2 | 2/2017 | Halme | |
| 9,697,016 | B2 | 7/2017 | Jacob | |
| 9,697,258 | B2 | 7/2017 | Barton | |
| 9,734,518 | B2 | 8/2017 | Suleman | |
| 2008/0208808 | A1 | 8/2008 | Sue | |
| 2009/0125403 | A1* | 5/2009 | Li | G06Q 30/0224 |
| | | | | 705/14.25 |
| 2010/0223252 | A1* | 9/2010 | Broman | G06F 16/954 |
| | | | | 707/709 |
| 2010/0250528 | A1* | 9/2010 | Punera | G06F 16/957 |
| | | | | 707/726 |
| 2012/0078874 | A1 | 3/2012 | Gonzalez | |
| 2012/0150831 | A1* | 6/2012 | Sun | G06F 16/951 |
| | | | | 707/706 |
| 2013/0238783 | A1* | 9/2013 | Alexander | G06F 16/954 |
| | | | | 709/224 |
| 2014/0358887 | A1 | 12/2014 | Morris | |
| 2015/0309698 | A1 | 10/2015 | Senderek | |
| 2017/0169111 | A1 | 6/2017 | Baum | |
| 2017/0201523 | A1 | 7/2017 | Palmer | |
| 2017/0220605 | A1 | 8/2017 | Nivala | |
| 2017/0357725 | A1 | 12/2017 | Hornkvist | |
| 2018/0121556 | A1 | 5/2018 | Badros | |
| 2019/0130444 | A1* | 5/2019 | Fei | G06N 20/00 |

OTHER PUBLICATIONS

"Autoregressive model", From Wikipedia, the free encyclopedia, Last edited Mar. 28, 2019, <https://en.wikipedia.org/wiki/Autoregressive_model>.

"Bayes' theorem", From Wikipedia, the free encyclopedia, Last edited on Mar. 16, 2019, <https://en.wikipedia.org/wiki/Bayes'_theorem>.

"Bayesian inference", From Wikipedia, the free encyclopedia, Last edited on Mar. 29, 2019, <https://en.wikipedia.org/wiki/Bayesian_inference>.

"Bayesian probability", From Wikipedia, the free encyclopedia, Last edited on Feb. 23, 2019, <https://www/en.wikipedia.org/wiki/Bayesian_probability>.

"Bayesian statistics", From Wikipedia, the free encyclopedia. Last edited on Apr. 12, 2019, 4 pages, https://en.wikipedia.org/wiki/Bayesian_statistics#cite_note-bda-1>.

"Conditional probability", From Wikipedia, the free encyclopedia, Last edited on Mar. 18, 2019, <https://en.wikipedia.org/wiki/Conditional_probability>.

"Errors and residuals", From Wikipedia, the free encyclopedia, last edited Dec. 28, 2018, <www.https://en.wikipedia.org/wiki/Erros_and_residuals>.

"Event (probability theory)", From Wikipedia, the free encyclopedia, Last edited on Mar. 25, 2019, <https://en.wikipedia.org/wiki/Event_(probability_theory)>.

"Frequentist probability", From Wikipedia, the free encyclopedia, Last edited on Mar. 14, 2019, <https://en.wikipedia.org/wiki/Frequentist_probability>.

"George E.P. Box", From Wikipedia, the free encyclopedia, Last edited on Mar. 29, 2019, <www.https://en.wikipedia.org/wiki/George_E._P._Box>.

"Gwilym Jenkins", From Wikipedia, the free encyclopedia, Last edited on Jan. 12, 2017, <www.https://en.wikipedia.org/wiki/Gwilym_Jenkins>.

"Headless Crawling", 2 pages, printed Jul. 3, 2018, copyright 2017 Ryte, <https://enlyte.com/wiki/Headless_Crawling>.

"JaSpell::Java Spelling Checking Package", SourceForge, 2004 copyright Bruno Marins—XLDB Group, Apr. 12, 2019, 1 page, <http://jaspell.sourceforge.net/>.

"Limit of a sequence", From Wikipedia, the free encyclopedia, Last edited on Feb. 6, 2019, <https://en.wikipedia.org/wiki/Limit_of_a_sequence>.

"Linear combination", From Wikipedia, the free encyclopedia, Last edited Oct. 22, 2018, <https://en.wikipedia.org/wiki/Linear_combination>.

"Moving-average model", From Wikipedia, the free encyclopedia, Last edited on Dec. 8, 2018, <https://en.wikipedia.org/wiki/Moving-average-model>.

"Open-Source Content Management Systems Lack Security", 5 pages, Aug. 25, 2018, <https://expert.services/blog/managing-your-website/security/hacking-open-source-cms.html>.

"Peter Whittle (mathematician)", From Wikipedia, the free encyclopedia, Last Edited on Feb. 27, 2019, <https://en.wikipedia.org/wiki/Peter_Whittle_(mathematician)>.

"Probability distribution", From Wikipedia, the free encyclopedia, Last edited on Mar. 29, 2019, <https://en.wikipedia.org/wiki/Probability_distribution>.

"Probability interpretations", From Wikipedia, the free encyclopedia, Last edited on Feb. 28, 2019, <https://en.wikipedia.org/wiki/Probability_interpretations>.

"Probability", From Wikipedia, the free encyclopedia, Last Edited on Mar. 18, 2019, <https://en.wikipedia.org/wiki/Probability>.

"Stationary process", From Wikipedia, the free encyclopedia, Last edited on Mar. 15, 2019, <https://en.wikipedia.org/wiki/Stationary_process>.

"Statistical model", From Wikipedia, the free encyclopedia, Last edited on Apr. 1, 2019, <https://en.wikipedia.org/wiki/Statistical_model>.

"Statistics", From Wikipedia, the free encyclopedia, Last edited on Mar. 29, 2019, <https://en.wikipedia.org/wiki/Statistics>.

"The making of ERS 2.0—Getting Started with Cloud CMS", 17 pages, 2017, The Headless Meet Cloud CMS, <https://www.google.com/url?sa=t&rct=j&q=&esrc=s&source=web&cd=1&ved=0ahUKEwj-plSd85bcAhWDfisKHYqbBa4QFggnMAAA&url=https%3A%2F%2Fwww.cloudcms.com%2Fdownloads%2Fpdfs%2FThe_Making_of_ERS.pdf&usg=AOvVaw1A17jUjRveK-5zAixyNjus>.

"Time series", From Wikipedia, the free encyclopedia, Last edited on Mar. 13, 2019, <https://en.wikipedia.org/wiki/Time_series>.

Adhikari, et al., "An Introductory Study on Time Series Modeling and Forecasting", 67 pages, <https://arxiv.org/ftp/arxiv/papers/1302/1302.6613.pdf>.

Cleveland, et al., "STL: A Seasonal-Trend Decomposition Procedure Based on Loess", journal of Official Statistics, vol. 6, No. 1, 1990, pp. 3-73, <https://www.wessa.net/download.stl.pdf>.

Exalead, "Search-Based Applications (SBAs)", Exalead Solutions Brief: Search-Based Applications (SBAs), v 1.1 © 2010 Exalead, pp. 1-8.

Kauffman, "A Better Authoring Experience for Headless CMS's", Mar. 7, 2018, pp. 1-4, <https://www.bloomreach.com/en/blog/2018/03/a-better-authoring-experience-for-headless-cms%E2%80%99s.html>.

Mell et al., "The NIST Definition of Cloud Computing", Recommendations of the National Institute of Standards and Technology, Special Publication 800-145, Sep. 2011, 7 pages.

Rack Blogger, "Content Management System Comparison: Performance Optimization", Jan. 20, 2011, The Official Rackspace Blog, 3 pages, <https://blog.rackspace.com/content_management_system_comparison_performance_optimization>.

Whittle, Peter, "Hypothesis testing in time series analysis", Uppsala, Almqvist & Wiksells boktr. 1951, 120 pages, <https://www.worldcat.org/title/hypothesis-testing-in-time-series-analysis/oclc/22153644>.

Kussmaul, et al., "Automatic Adaption of a Search Configuration", U.S. Appl. No. 16/384,973, filed Apr. 16, 2019, (a copy is not provided as this application is available to the Examiner).

Kussmaul, et al., "Automatic Check of Search Configuration Changes", U.S. Appl. No. 16/384,974, filed Apr. 16, 2019, (a copy is not provided as this application is available to the Examiner).

(56) References Cited

OTHER PUBLICATIONS

Kussmaul, et al., "Managing Search Queries of a Search Service", U.S. Appl. No. 16/384,979, filed Apr. 16, 2019, (a copy is not provided as this application is available to the Examiner).
Kussmaul, et al., "Personalizing a Search of a Search Service", U.S. Appl. No. 16/384,981, filed Apr. 16, 2019, (a copy is not provided as this application is available to the Examiner).
Kussmaul, et al., "Preventing Search Fraud", U.S. Appl. No. 16/384,978, filed Apr. 16, 2019, (a copy is not provided as this application is available to the Examiner).
Kussmaul, et al., "User-Driven Adaptation of Rankings of Navigation Elements", U.S. Appl. No. 16/384,975, filed Apr. 16, 2019, (a copy is not provided as this application is available to the Examiner).
List of IBM Patents or Patent Applications Treated as Related, Appendix P, Filed Herewith.

* cited by examiner

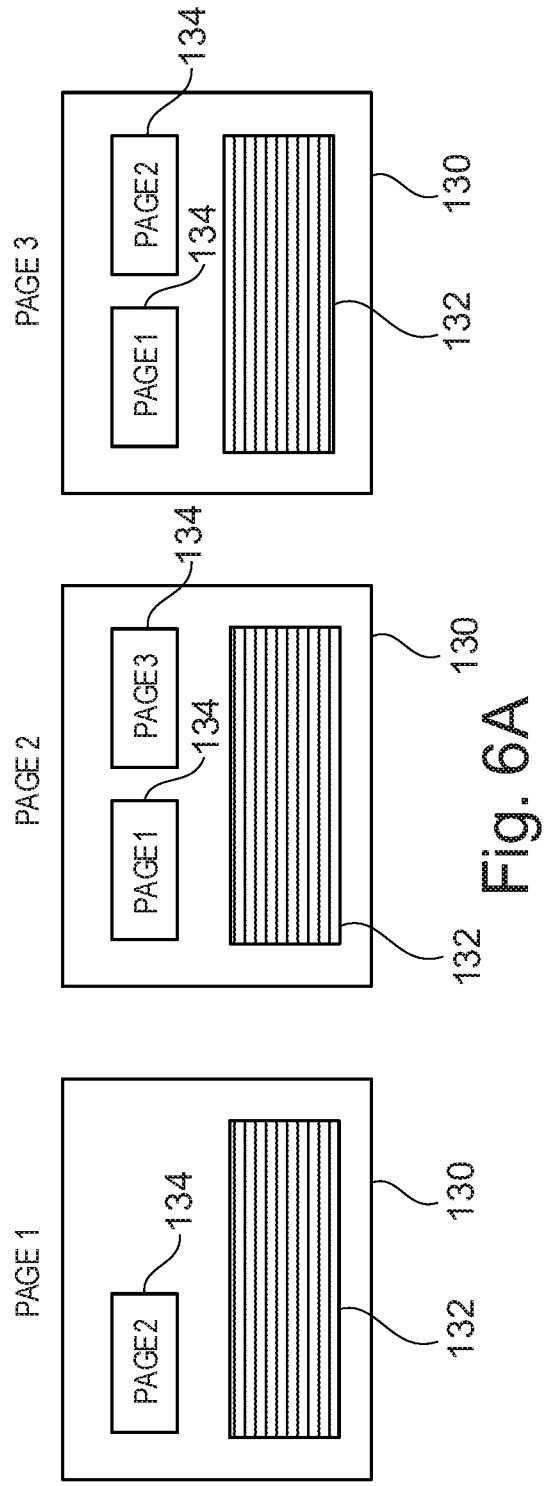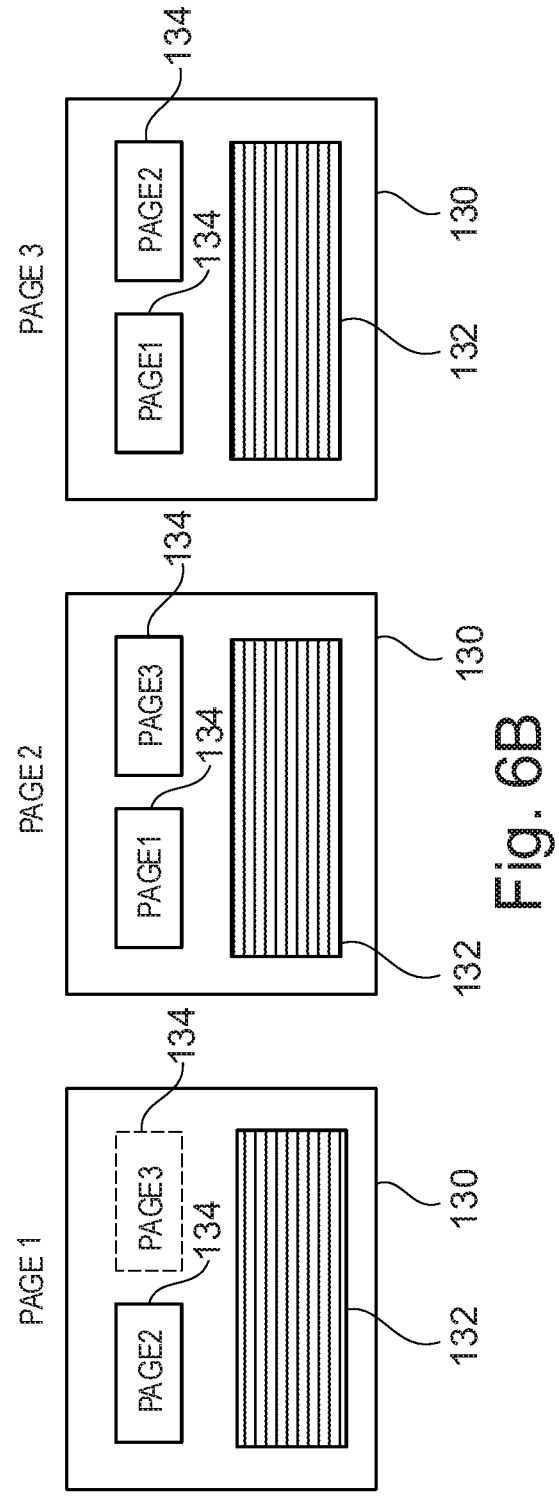

| START NODE | TARGET NODE | SCORE |
|---|---|---|
| 1 | 2 | 0 |
| 1 | 3 | 5 |
| 2 | 1 | 0 |
| 2 | 3 | 0 |
| 3 | 1 | 0 |
| 3 | 2 | 0 |

NAVIGATION PATHS BETWEEN CONTENT ITEMS

BACKGROUND

The present disclosure relates to the field of electronic data processing and, more specifically, to for automatically implement one or more improved navigation paths between content items provided by a content management system.

Client applications, also referred to as search-based applications, may rely on a search service to identify and retrieve information that is required for the functionality of the client application, like content and navigation elements. The client application sends during runtime search queries to the search service and retrieves the information that is required, e.g., for rendering application views from search results of the search queries. The application views present the content and the navigation elements retrieved from the search service to a user of the client application.

SUMMARY

Various embodiments provide a method for automatically implementing one or more improved navigation paths between content items provided by a content management system as well as a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a method for automatically implementing one or more improved navigation paths between content items provided by a content management system. The content management system comprises a search service. The search service comprises a search monitoring component configured for monitoring first search queries issued by a client application and for determining navigation paths used by a user of the client application for navigating between content items searched for by the monitored first search queries. The search service further comprises a navigation optimization component configured for determining improved navigation paths using the navigation paths determined by the search monitoring component.

The method comprises monitoring by the search monitoring component the first search queries. The search monitoring component determines a set of navigation paths used by the user for navigation between the content items searched for by the monitored first search queries. The navigation optimization component determines a set of start content items and a set of target content items. Each of the start content items is linked with at least one of the target content items by a sequence of one or more of the determined navigation paths. The navigation optimization component determines a set of content item pairs. Each content item pair comprises a start content item from the set of start content items and a target content item from the set of target content items linked with the respective start content item. The navigation optimization component assigns each content item pair of the set of content item pairs with a score identifying a relevance of the respective content item pair for the user. The navigation optimization component creates a set of one or more improved navigation paths. The set of improved navigation paths comprises an additional navigation path for each content item pair with a score exceeding a first predefined threshold. The respective additional navigation path directly links the start content item and target content item of the respective content item pair. The navigation optimization component assigns each of the one or more additional navigation paths to be provided to the client application for display as part of first search query results of the first search queries.

In a further aspect, the invention relates to a computer program product comprising a non-volatile computer-readable storage medium having computer-readable program code embodied therewith for automatically implementing one or more improved navigation paths between content items provided by a content management system. The content management system comprises a search service. The search service comprises a search monitoring component configured for monitoring first search queries issued by a client application and for determining navigation paths used by a user of the client application for navigating between content items searched for by the monitored first search queries. The search service further comprises a navigation optimization component configured for determining improved navigation paths using the navigation paths determined by the search monitoring component.

The implementing of the improved navigation paths comprises monitoring by the search monitoring component the first search queries. The search monitoring component determines a set of navigation paths used by the user for navigation between the content items searched for by the monitored first search queries. The navigation optimization component determines a set of start content items and a set of target content items. Each of the start content items is linked with at least one of the target content items by a sequence of one or more of the determined navigation paths. The navigation optimization component determines a set of content item pairs. Each content item pair comprises a start content item from the set of start content items and a target content item from the set of target content items linked with the respective start content item. The navigation optimization component assigns each content item pair of the set of content item pairs with a score identifying a relevance of the respective content item pair for the user. The navigation optimization component creates a set of one or more improved navigation paths. The set of improved navigation paths comprises an additional navigation path for each content item pair with a score exceeding a first predefined threshold. The respective additional navigation path directly links the start content item and target content item of the respective content item pair. The navigation optimization component assigns each of the one or more additional navigation paths to be provided to the client application for display as part of first search query results of the first search queries.

In a further aspect, the invention relates to a computer system for automatically implementing one or more improved navigation paths between content items provided by a content management system executed on the computer system. The content management system comprises a search service. The search service comprises a search monitoring component configured for monitoring first search queries issued by a client application and for determining navigation paths used by a user of the client application for navigating between content items searched for by the monitored first search queries. The search service further comprises a navigation optimization component configured for determining improved navigation paths using the navigation paths determined by the search monitoring component.

The computer system comprises a processor and a memory storing machine-executable program instructions.

Executing the program instructions by the processor causes the processor to control the computer system to monitor by the search monitoring component the first search queries. The search monitoring component determines a set of navigation paths used by the user for navigation between the content items searched for by the monitored first search queries. The navigation optimization component determines a set of start content items and a set of target content items. Each of the start content items is linked with at least one of the target content items by a sequence of one or more of the determined navigation paths. The navigation optimization component determines a set of content item pairs. Each content item pair comprises a start content item from the set of start content items and a target content item from the set of target content items linked with the respective start content item. The navigation optimization component assigns each content item pair of the set of content item pairs with a score identifying a relevance of the respective content item pair for the user. The navigation optimization component creates a set of one or more improved navigation paths. The set of improved navigation paths comprises an additional navigation path for each content item pair with a score exceeding a first predefined threshold. The respective additional navigation path directly links the start content item and target content item of the respective content item pair. The navigation optimization component assigns each of the one or more additional navigation paths to be provided to the client application for display as part of first search query results of the first search queries.

BRIEF DESCRIPTION OF THE SEVERAL VIEWS OF THE DRAWINGS

In the following, embodiments of the invention are explained in greater detail, by way of example only, making reference to the drawings in which:

FIG. 6A depicts schematic diagrams illustrating exemplary application views before adding an additional navigation element, FIG. 6B depicts schematic diagrams illustrating exemplary application views after adding an additional navigation element.

DETAILED DESCRIPTION

Figure 1:
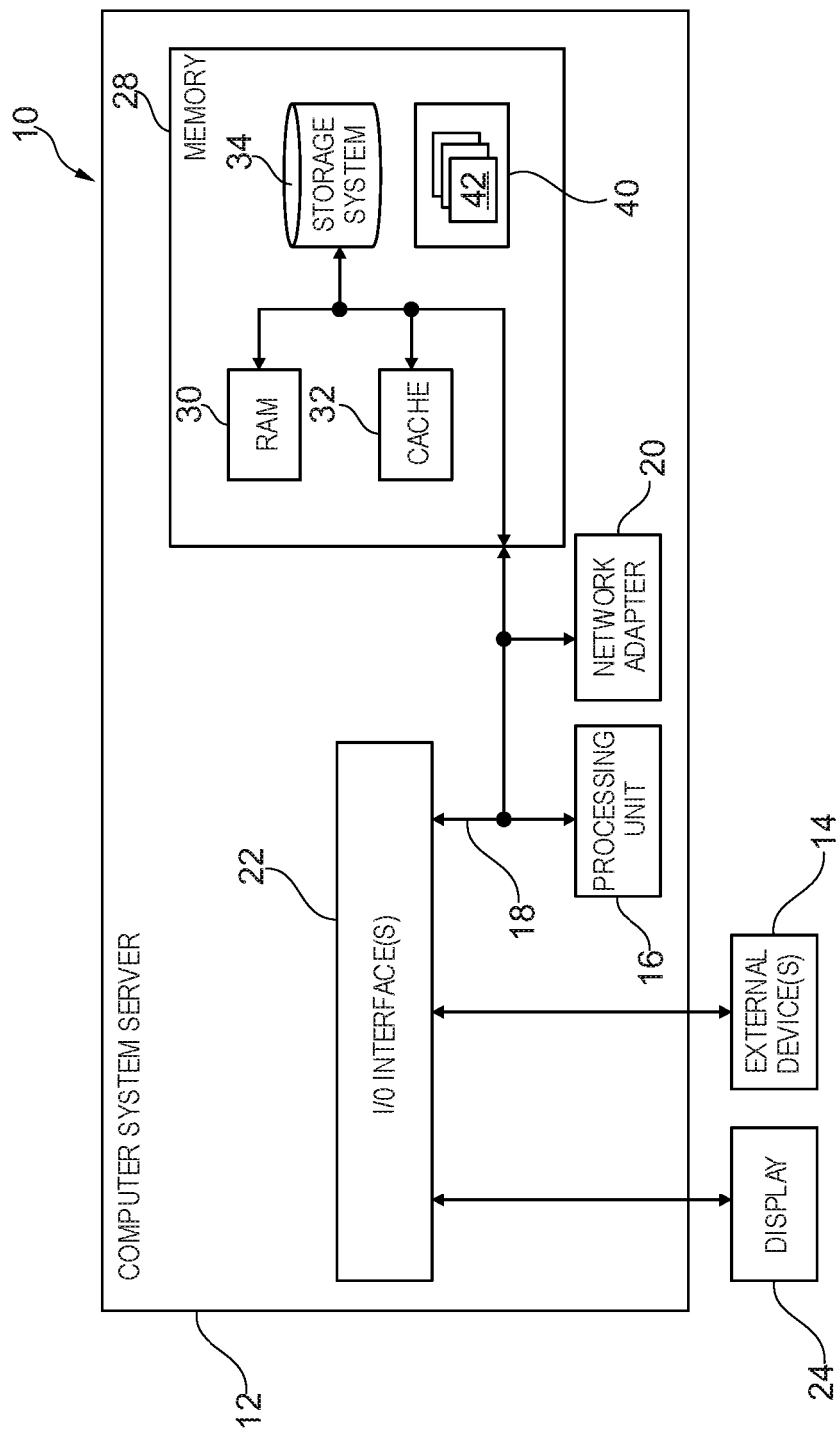
FIG. 1 depicts a schematic diagram illustrating an exemplary cloud computing node according to an embodiment.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of providing a method for automatically implementing improved navigation paths between content items of a client application, i.e., a search-based application. Improved navigation paths are shorter cuts leading a user directly to target items which are most relevant for the respective user, i.e., for which there is a high probability that they correspond to needs and/or preferences of the user.

According to embodiments, it may be monitored analyzed how a user previously used a search-based application. This insight may be used to automatically extend, enhance and/or adapt a user interface of the search-based application, e.g., by creating additional navigation elements providing additional navigation paths between the views, i.e., pages of the search-based application. This extension, enhancement and/or adaption may be implemented by adapting search queries that are used for determining navigation paths to be provided by views displayed on a user interface according to the user's interests, needs and/or preferences. In following, these adapted search queries providing user-adapted search queries may also be referred to as second search queries. These second search queries may be search results of first search queries issued by the search-based application, while the second search queries are managed by the content management system in form of content items.

For example, a user's previous usage patterns of applications views provided by the search-based application and in particular usage pattern of navigation elements, i.e., navigations paths used, may be determined by monitoring the search queries issued by the search-based application on behalf of the user. The search-based application may be provided in form of a client application.

Thus, additional navigation elements implementing improved navigation paths may automatically be created in a search-based application depending on a user's navigation history, i.e., depending on how the user previously navigated between different views of the application, e.g., by selecting menu items or following other navigation elements. Previous usage patterns may be determined from monitored previous search queries issued by the search-based application on behalf of a user.

Embodiments may thus provide an enhanced user experience of a search-based application program, improve user confidence and user productivity as well as lower efforts required for maintenance and support. According to embodiments the method may work automatically and without requiring modifications and/or code changes in the client application, i.e., search-based application.

In a service-oriented software architecture, a service refers to a software component which provides an application programming interface (API) configured to be accessible or invokable by other services or software components using a standard protocol or a standard invocation mechanism. A service may be implemented, created, removed, deployed, started and stopped independently of other services.

An API refers to a set of predefined methods of communication among software components. An API may comprise a set of subroutine definitions, communication protocols, and/or tools for building software. Thus, an API may provide a set of building blocks which may be combined for developing computer programs. An API specification defining an API may, e.g., comprise specifications for routines, data structures, object classes, variables, an/or remote calls.

In a service infrastructure, multiple instances of one service may be running in order to improve fault tolerance, throughput and load balancing of service requests. Each of the instances of the service may provide the same APIs and the same functionality. Each of the instances may be based on the same implementation, e.g. code, docker image and/or deployment artefact.

An interaction of a first service with a second service may comprise sending a service request for invoking an operation of one of the APIs provided by the second service. A service request may comprise an identifier of the requested API operation, e.g., in form of an URL or another parameter. In addition, a service request may comprise further data relevant for processing the service request.

A service infrastructure may comprise at least one service registry providing functionality for a service discovery and/or service lookup. A service registry may manage information about active, i.e., running, services of the service infrastructure. Before a first service invokes a second service, the first service may send a lookup request to the service registry containing a set of one or more criteria for selecting the second service, such as a service name and/or service identifier. A service name may be hardcoded in an implementation of the first service. Upon receipt of the lookup request, the service registry may select a service instance which adheres to the specified one or more criteria specified by the lookup request and return information about the selected service instance to the first service. The respective information may comprise an address, e.g., an URL, hostname, IP address and/or port, for use by the first service to create and send an invocation request to the second service. In case there is no service satisfying the one or more criteria specified by the lookup request, the service registry may return an error message.

A service registry may maintain information about a status and/or health of each service instance and consider only healthy services for service discovery requests, i.e., service lookup requests. In case a service instance becomes unresponsive and/or unhealthy, the service registry may no longer provide an address and/or information about the respective service instance to other services. The service registry may further incorporate a load balancing algorithm for distributing load between service instances, e.g. using random choice, round robin, and/or least connections.

A service may register at the service registry, e.g., immediately after starting. The registering may for example comprise sending a registration request including an address of the service to be registered. The registration request may further comprise data like, e.g., a service identifier and/or a set of identifiers of one or more APIs provided by the service to be registered. The service registry may, e.g., regularly, invoke a health check, e.g., in form of a status request, on each registered service. The invoked service may respond by returning status information. The status information may, e.g., comprise a flag indicating whether the respective service is healthy or unhealthy. If the returned status indicates a problem or if a service does not respond in time, the service registry may flag the respective service as unhealthy.

According to embodiments, a service registry may select a service instance based on two simple criteria: a binary flag representing a health status of the respective service and a service identifier, like, e.g., a service name.

A services infrastructure may be built using cloud computing. A computing component of the cloud may be separated from the Internet, e.g., by a firewall. An API gateway may provide access to client applications, i.e., client application programs, like mobile applications executed on a mobile communication device, e.g., a smartphone, to desktop applications executed on desktop computers, scripts executed in a browser, etc. An API gateway may receive requests issued by client applications and create a service lookup requests using the client requests. The service lookup requests may be sent to the service registry by the API gateway. In response to sending the service lookup requests, the API gateway may receive one or more addresses of service instances to be invoked and send invocation requests to the respective service instances. In response to sending the invocation requests, the API gateway may receive responses from the respective service instances and create one or more responses to the client request using the responses received from the service instances. The responses created by the API gateway may be returned to the requesting client applications.

While processing a request received from an API Gateway, a service instance may need to invoke another service. For this purpose, the service instance may prepare a lookup request, send the prepared lookup request to a service registry, receive in response to sending the lookup request an address of a service instance and invoke the respective service instance using the received address.

Services may use state of the art software engineering mechanisms, like e.g. caching, persistent storage, session and state management, connection and thread pooling, etc. For example, caching may improve performance. A computer system may cache, i.e., store in a cache memory, data that was recently used, e.g. while processing recent requests. Since requests may be distributed between service instances, individual service instances may have different cache entries. In other words, the state of a service instance may depend on an individual usage history of the respective service instance. Service performance may depend on whether data relevant for processing a request is available in a cache memory assigned to the respective service or not. Thus, service performance for processing the same request may differ between individual service instances. It is therefore preferable to intelligently select service instances for processing a request.

A service performance may depend heavily on the data in a cache memory assigned to the respective service. However; there may be no standard for sharing detailed information about cache contents between service instances and service registries. Thus, this information may not be available during service lookup, e.g., for selecting a particular service instance.

A service infrastructure and a service implemented therein, like, e.g., a search service, may serve multiple users and multiple tenants. A tenant refers to a group of users, e.g., a company, who share a common access with specific privileges to a software instance, i.e. service instance. The service infrastructure and implemented service may ensure that tenant specific data assigned to a particular tenant is isolated from other tenants. Client requests and service requests may comprise a tenant identification identifying a tenant which is associated with the respective requests. The tenant identification may enable the service infrastructure component to establish a context and state required for processing the respective requests.

A content management system (CMS) may manage a creation of digital content items, such as text documents, web pages, images, videos, code scripts, etc. A content management system may support multiple users in a collaborative environment. Modern enterprise-scale content management systems may be based on separate content authoring and content delivery systems. Thereby, different requirements of content creation and retrieval tasks may be met. A process responsible for creating, modifying and editing content may take place in the authoring system and be referred to as authoring. A process responsible for transferring content from the authoring system to the delivery system may be referred to as publishing. A content is either transferred as it is, e.g., text, video, images, static files, or in a transformed formed, e.g., pre-render templates.

A content management system may provide an authoring user interface for editing and managing content items. A content management system may be configured as a headless CMS, i.e., may not provide a visual user interface, but rather provide a set of APIs, which may be called by client applications to create, edit and retrieve content items.

This may allow a client application to provide a user interface and functionality for content authoring as well as to invoke APIs to create, edit and retrieve content items.

An authoring system may allow content authors to create, edit and manage content items. The authoring system may include an authoring user interface or may just provide authoring APIs. Furthermore, the authoring system may allow to upload or import files.

A content management system may further provide a publishing system configured for publishing content items from the authoring system to a delivery system or component, like a content delivery network (CDN), to make the content available to the public. The publishing system may also incorporate further functionalities, like indexing content items in a search index, modifying, transforming or prerendering content items, etc. Publishing may be started manually by a content author, may be invoked on schedule or may be invoked via a publishing API operation.

A content management system may provide a functionality to define different types of content items. For example, the content management system may provide a predefined list of possible content item types. The type of a content item may, e.g., be selected by the user using an authoring system or component. The content management system may represent and store the content item type as a specific field in the content item. The respective field may, e.g., be named "type" or "classification". For example, a content management system may provide the following predefined content item types: "content", "asset", "page", "page template". A content management system and client applications, which retrieve and use the content items, may handle content items of different type separately. For example, a client application may use a first content item of type "page" to render a view of a page.

A content management system may be deployed in a cloud environment and implemented as a set of interacting services. An API gateway may provide an API to application programs, like, e.g., client application, authoring application, etc. and forward requests and responses between the respective applications and the services provided by the content management system.

A content management system may comprise a search service component or may alternatively use a search service external to the content management system. An authoring system may allow content authors to search for content items, a publishing system may index published content items in a delivery search index, thereby allowing client applications to search for content. The authoring system may index content items in an authoring index, when a content item is created, updated or deleted. The publishing system may index content items during publishing. As part of publishing, the publishing system may further update a configuration of the search index and invoke a learning to rank method in a training mode in order to recalculate a ranking model.

End users may rely on a search service to find a certain content in the web site, like, e.g., products in a web shop. Furthermore, content management system client applications may use the search to lookup content to be rendered and content for establishing, e.g., a page hierarchy for navigation. Therefore, search quality and relevance ranking of search results may be important for end users as well as for an operator of a web site.

A search service may provide functionality for searching in unstructured data, like e.g. text documents. For this purpose, a search service provides functionality to create a search index by indexing content items, i.e. data to be searched, like e.g. text documents. A search index may contain a representation of a data content to be searched, in a representation which is suited, e.g. improved, for processing by the search service. The search service may provide an application programming interface API for indexing content items, which makes the respective content items searchable by the search service. Further the search service may provide a query API allowing a client, e.g. another service or an application, to issue a search query. A search query may contain a set of query parameters specifying search criteria for searching content items, like e.g. a set of search terms. The search service may process the query by selecting and ranking a set of content items according to a search query. The ranking may determine a scoring or an order of the respective content items relative to the search query, which represents for each of the content items a level of relevance in relation to the respective search query. A search query may also contain parameters for controlling the ranking, like e.g. a ranking query, a boost query and/or a boost function. Furthermore or alternatively, a search service may automatically select one or more heuristics and/or parameters for a search ranking. A search ranking may for example be based on statistics about the search collection and the search terms used for a search. Furthermore, the search ranking may be based on statistics of an occurrence of search terms in specific content items.

For a ranking, e.g. the tf-idf method (term frequency-inverse document frequency) may be used, which is a numerical statistic intended to reflect an importance or relevance of a word for a document in a search collection. Tf-idf values may be used in search service as weighting factors in ranking a document's relevancy relative to a given search query. An tf-idf value increases proportionally to the number of times a word appears in a document and is offset by the frequency of appearance of the word in the search collection.

A search service may manage multiple search indexes, e.g. assigned to multiple tenants. Thus, a search service may be used in a multi-tenant environment e.g. by creating a separate search index for each tenant. In this case, search client services may be required to correctly select the correct index to use for search requests depending on a tenant context.

A search index may be associated with a specific search configuration, consisting of multiple configuration parameters defining settings which control search functionality, behavior and e.g. the structure of the content items in a search index. Search configuration parameters may be updatable and/or changeable via a search service API or by uploading a set of configuration parameter changes, e.g. in form of one or more configuration files, to the search service, a file system or a persistent storage the search service is using.

A headless content management system may be used to support a new programming model for client applications, herein referred to as search-based applications or search-based application programs. Search-based applications rely on a search service to identify and retrieve contents, navigation information, site structures and/or page structures, etc. that is required for the functionality of the respective application. For example, during runtime an application may send a series of search queries to a search service and retrieve information required for rendering the current view of the application from the search responses. In contrast to other programming models, the application may, e.g., not use databases, file systems or other persistency components for managing this information. In order to support the search-based application, the content management system may provide the search service for the search-based application.

Content authors may use the content management system to edit information that is relevant for the search-based applications, like site structures, page structures, navigation structures, and contents, as well as assets, like images, videos, etc. Using this information, content authors may further create new pages, author new content, define new content types and/or define new page types. A modified site may be reviewed, approved, and subsequently published using the content management system. A CMS publishing component used for publishing may index the data in a search service. Therefore, when the publishing is completed, the data may be available to search-based applications through interfaces of the search service.

A search-based application may rely on sending search queries to a search service to retrieve content and the navigation elements to be presented to a user. User interface components may be used for rendering information, like, e.g., page headers and page footers for rendering a page, site maps, trees, menus, or links for rendering the site structure or navigation structure, etc. This way, layout aspects may be separated from the content, site structure and navigation structure.

Embodiments may have the beneficial effect that search queries used by a search-based application are not hard-coded in the application code as defined by an application developer during development of the respective search-based application or provided in a properties file which is part of the respective application. Thus, the search queries of the search-based application are changeable by modifying the application. In order to be able to use modified search queries a user is not required to update or redeploy a modified version of the application comprising the modified search queries on a client device.

According to embodiments, the determining of the set of navigation paths comprises analyzing a temporal sequence in which the monitored first search queries are received. Embodiments may have the beneficial effect that the temporal sequence of the monitored first search queries may be used to reconstruct navigation paths used by the user to navigate through content provided via the client application. When starting the client application an initial first search query may be received. A search result provided as a response to the initial first search query may comprise an initial content item used by the user as an initial start content item. The initial start content item may be provided to the user by an initial application view displayed to the user on a user interface of the client application. The user may use a navigation element provided by the initial application view to navigate to a next application view providing a target content item of interest for the user. In response to a triggering of the respective navigation element by the user, the client application may issue a further first search query in order to retrieve the content data managed by the content management system required for displaying the next application view on the user interface. A search result provided as a response to the further first search query may comprise a content item used by the user as a target content item. Thus, by following the sequence of the first search query a sequence of content items may be identified using the search results provided in response to the respective first search queries. This sequence of content items represents a sequence of navigation paths followed by the user. The respective content items may be ranked regarding their relevance for the user and the most relevant content items may be determined. For theses most relevant content items additional navigation path implemented by additional navigation elements may be defined in order to provide the user with direct links between the most relevant content items. Thus, the user may be enabled to navigate faster and easier to content items of interest.

According to embodiments, the determining of the navigation paths comprises considering each first search query of the temporal sequence except for an initial first search query of the temporal sequence. A first search query directly preceding the considered first search query is determined and a navigation path identified. The identified navigation path starts with a content item search for by the first search query directly preceding the considered first search query and ends with a content item searched for by the considered first search query.

Embodiments may have the beneficial effect that using the temporal sequence of first search queries, a sequence of navigation paths followed by the user through the content provided via the reconstructed path by path. A navigation path may be defined by a start content item and a target content item. Furthermore, the respective path may be weighted according to a frequency, i.e. a number per timeframe, or a total number of usages of the respective path by the respective user.

According to embodiments, each temporal sequence comprises first search queries assigned to a common user session. Embodiments may have the beneficial effect that a navigation behavior of an individual user per user session may be reconstructed.

According to embodiments, the set of start content items comprises start content items which are assigned with a second score identifying a relevance of the respective start content item for the user exceeding a second predefined threshold. Embodiments may have the beneficial effect of taking into account only relevant start content items for defining additional navigation paths. Furthermore, the number of potential additional navigation path to be check for their relevance may thus be limited. According to embodiments, the set of target content items comprises target content items which are assigned with a third score identifying a relevance of the respective target content item for the user exceeding a third predefined threshold. Embodiments may have the beneficial effect of taking into account only relevant target content items for defining additional navigation paths. Furthermore, the number of potential additional navigation path to be check for their relevance may thus be limited.

According to embodiments, the content items are application view identifiers identifying views search for by the first search queries in order to be displayed by the client application.

According to embodiments, the set of navigation paths represents a directed graph of the navigation paths. Each navigation path comprises a first vertex representing a start content item, a second vertex representing a target content item and a least directed edge connecting the first and second vertex. Embodiments may have the beneficial effect of providing a helpful representation of navigation paths followed by the user through the content, e.g., application views provided by the client application. The representation may have the beneficial effect to provide a toll for identifying efficiently and effectively potential additional navigation paths through the graph or mesh spanned by the set of navigation paths already used by the user.

According to embodiments, an additional navigation path directly linking a start and a target content item is a navigation path comprising a single directed edge connecting a first vertex representing the start content item and a second vertex representing the target content item. According to embodiments, the directed edge is assigned with at least one metric representing a relevance of the respective navigation path for the user. Thus, navigation paths most relevant to the user, e.g., used most frequently by the respective user, may be identifiable using the respective directed graph of navigation paths. According to embodiments, the metric represents how frequently the user navigated between the first and second vertex within a given timeframe.

According to embodiments, the method further comprises storing the set of navigation paths. The set of navigation paths may be stored by the content management system. Embodiments may have the beneficial effect of enabling to keep track of all the navigation paths used by the user. Furthermore, the metrics represents how frequently the user navigated between content items may be updated and stored with respective paths. Thus, a navigation behavior of the user of time may be recorded and evaluated in order to identify potential additional navigation paths. Furthermore, the navigation behavior of a user may change over time. Thus, navigation paths not used frequently before, may be used more and more frequently with time until also additional paths for content items connected by these navigation paths may be determined. According to embodiments, the method further comprises, if a navigation path determined by the search monitoring component is already stored, updating the metric of the stored navigation path taking into account the additional use of the respective navigation path by the user.

According to embodiments, an improved navigation path between a start content item and a target content item is a navigation path linking the respective start content item and target content item directly. Embodiments may have the beneficial effect providing the user with an improved navigation experience enabling the user to navigate directly and thus faster and more target orientated to content items most relevant for the respective user.

According to embodiments, each content item pair represents a potential additional navigation path directly linking the two content items of the respective content item pair. For each of the potential navigation paths it may be determined whether the respective potential additional navigation path is already comprised by the set of known navigation paths used by the user and, if it is unknown, whether the respective navigation path is relevant enough to actually improve the navigation of the user.

According to embodiments, the method further comprises updating the stored set of navigation paths with the additional navigation paths. Embodiments may have the beneficial effect of taking into account for future analysis also the additional navigation paths.

According to embodiments, the calculated score identifying the relevance of the respective content item pair is zero, if the additional navigation path is already comprised by the set of navigation paths. Embodiments may have the beneficial effect that additional navigation paths which are already known are neglected for updating the set of navigation paths, since they are already comprised by the respective set and provided to the user.

According to embodiments, the calculation of the score identifying the relevance of the respective content item pair takes into account one or more of the following: how often the user used the individual content items of the respective content item pair, how long the user used the individual content items of the respective content item pair, how the user used the individual content items of the respective content item pair, and how may user interactions in a given timeframe are saved by the additional navigation path linking the two content items directly relative to a number of user interaction required for navigating between the respective content item pair using a combination of navigation paths requiring already comprised by the set of navigations paths and currently requiring a smallest number of interaction.

Embodiments may have the beneficial effect enabling an efficient and effective identification of the relevance of content item pairs and thus of potential navigation paths linking the respective content items. For example, the score may include a factor proportional to a ratio of a number of visits including user interactions to the target content item, e.g., target application view, within a given timeframe, e.g., in the last 30 days, and a total number of visits to the target content item within the respective timeframe. According to embodiments, the score may further include a corresponding factor for a start content item, e.g., start application view, of the same pair of content items. The goal for scoring may be to filter out irrelevant potential direct navigation paths. According to further examples, the score may include a factor proportional to the average length of all navigation paths or combination of navigation paths, a user used to navigate between a start content item and a target content item of a pair of content items within a given timeframe, e.g., in the last 30 days.

According to embodiments, the method further comprises creating for each of the additional navigation paths an additional navigation element representing the respective additional navigation path. Embodiments may have the beneficial effect that the respective additional navigation elements may be provided as part of application views of the client application. Thus, by triggering, e.g. clicking on, the respective navigation elements, a user may be enabled to use the additional navigation paths.

According to embodiments, the method further comprises storing the additional navigation elements as additional content items in a search index of the search service. The additional content items each comprise one or more keywords identifying the respective additional content item. Embodiments may have the beneficial effect of enabling an effective and efficient management of the additional navigation elements by the content management system.

According to embodiments, the additional navigation elements each represent a link to be presented by the client application with the start content item of the additional navigation path and provide a navigation tool to directly navigate to the target content item. Embodiments may have the beneficial effect enabling the user to use the additional navigation paths in an effective and efficient way.

According to embodiments, the search service comprises a set of second search queries. Each of the second search queries is stored as a content item in the search index comprising one or more keywords identifying the respective second search query. A plurality of first search queries comprise a boosting factor referring to one or more of the keywords. The method further comprises executing by the search service a first search query of the plurality of first search queries issued by the client application. The search service provides as a first search result of the respective first search query one or more second search queries comprising the one or more keywords referred to by the boosting factor of the respective first search query. The search service executes the one or more second search query provided as the first search result and provides second search results of the respective second search queries to the client application to be used as a search result for the issued first search query.

According to embodiments, the method further comprises for each additional navigation path identifying by the navigation optimization component each second search query comprising an identifier of a start content item of the respective additional navigation path. The navigation optimization component creates a personalized version of each of the identified second search queries. The personalized versions of the identified second search queries each comprise an additional navigation element identifier of the respective additional navigation path and are assigned to the user for which the respective second search query is personalized. The personalized versions of the identified second search queries are stored in the search index.

Embodiments may have the beneficial effect that by modifying the second search queries, i.e. the search results of the first search queries, the functionality of the search-based application may be influenced without requiring a code change in the search-based application.

According to embodiments, the search-based application does not contain hardcoded search queries. Instead the search queries to retrieve data used by the search-based application, such as content items, menu items, navigation elements etc., is managed in the content management system. For this purpose, a second search query may be represented as a content item or a set of content items of a specific content type. This allows a content author to use the normal authoring functionality to create and edit second search queries, which are handled like content items by the content management system. The second search queries may be modified to take into account the additional navigation paths independently of the code of the search-based application. The implementation of additional navigation paths may rather be implemented automatically.

According to embodiments, a search-based application may implement a web shop including a product catalog. Following a search-based application programming model, the application may issue first search queries to retrieve data for navigation elements, e.g. in form of menu items. In case, it turns out that a navigation paths provided for the user by a given set of navigation elements are not suitable for a user's needs and/or preference, additional navigation paths may automatically be identified which enable the respective user to navigate more efficiently between navigation views of relevance to the user.

Embodiments allow for an automatic implementation of additional navigation paths without a need to wait for a developer to update the application code. The additional navigation paths may rather be identified based on a navigation behavior of the user representing the user's needs and preferences. Furthermore, content items representing second search queries for retrieving navigation elements to be provided to the user in response to first search queries issued by the client application may be modified to take into account the additional navigation paths. Thus, based on the user's navigation behavior personalized versions of second search queries be created in order to implemented navigation elements representing navigation paths optimized for an individual user. The additional navigation paths are implemented on the content management system and may thus get effective for all installations of the application on all clients for the respective user, without requiring an update of any application.

According to embodiments, the method further comprises creating and storing a personalized version of the second search query assigned to the user for which the additional navigation paths are provided. Embodiments may have the beneficial effect of providing personalized search queries resulting in search results optimized for needs and/or preferences of an individual user.

According to embodiments, the additional navigation element identifier is included in a disjunctively connected subquery comprised by each personalized version of the identified second search queries. Embodiments may have the beneficial effect that the respective disjunctively connected subquery may be used as a boost factor to ensure that a potential personalized version of the second search query is higher ranked than a non-personalized version, i.e. that a personalized version providing additional navigation paths may be used rather than a non-personalized version. A disjunctive connection implements a logical "or" as a truth-functional operator of a set of operands which is true if and only if one or more of its operands are true. The disjunctive connection may, e.g., have the form "q= . . . OR id:<additional navigation element id>". This subquery may ensure that all potential search results comprising the respective identifier "additional navigation element id" of the additional navigation element, i.e. taking into account the additional navigation element, may be identified by the respective personalized version of the second search queries.

According to embodiments, each personalized version of the identified second search queries comprises a search query identifier and the identifier of the start content item of the non-personalized version of the respective identified second search query. The personalized version of the respective identified second search query further comprises a user identifier identifying the user for which the respective personalized version of the respective identified second search query is personalized. Embodiments may have the beneficial effect that personalized versions of second search queries in addition to a search query identifier and an identifier of a start content item further comprise a user identifier. Thus, by taking into account not only the search query identifier and the identifier of a start content item, but also the user identifier the personalized version of a second search query may be identifiable.

According to embodiments, the personalized second search query further comprises one or more user group identifiers. Embodiments may have the beneficial effect that personalized second search queries may be provided not only for an individual user, but to each user of a common group of users. According to embodiments, the user identifier is alternatively provided in form of a user group identifier. Embodiments may have the beneficial effect the personalized second search queries may be personalized for groups of users rather than individual users.

According to embodiments, the boosting factor of the first search query comprises a user identifier of a user as a keyword for identifying the personalized version of a second search query comprising the user identifier. The second search result provided as a second search result of the personalized version of a second search query comprises the additional navigation element representing the additional navigation path. The using of the second search result by the client application as a search result for the issued first search query comprises displaying the respective additional navigation element.

Embodiments may have the beneficial effect of ensuring that a potential personalized version of the second search query is higher ranked than a non-personalized version, i.e. that a personalized version providing additional navigation paths may be used rather than a non-personalized version.

A search-based application program (SBA) retrieves for example content, menu items, navigation elements, such as links to other pages or views, which are to be presented to a user by issuing one or multiple search queries to a search service. The menu items and navigation elements may be represented as content items in a search index and may be managed, i.e. created, read, updated and/or deleted (CRUD), through an authoring service. The search service executes the query and returns a resulting list comprising, e.g., content, menu items, navigation elements to the search-based application program. The result list may be ordered according to a ranking, e.g., computed by the search service or a component comprised by the search service. According to embodiments, the method may use the following search-based application program pattern and method: The search-based application program may use a two-phase search process to retrieve content items, menu items, navigation elements, etc.

In a first phase, the search-based application program may issue a first search query containing, e.g., either an identifier of the search-based application program as well as an identifier of a certain view of the search-based application program or alternatively a query identifier of a second search query, and as part of a boost (sub-)query a user identifier as well as one or more group identifier identifying one or more user groups the user belongs to. This boost query may enable to rank a potential personalized version of the second search query higher than a non-personalized version.

The search index contains a set of content items representing second search queries. These content items contain a representation of a search query in a suitable query syntax, e.g., in Solr query syntax, as well as a set of keywords, used for finding or ranking the content item. These keywords may comprise the query identifier and the search-based application program identifier and search-based application program view identifier and optionally user identifiers and group identifiers. In case the second search query is personalized for one or more users, there may be multiple personalized versions of one second search query for different users and/or user groups. The second search query may be created or modified either automatically or by a content author directly editing the respective content items in the authoring service.

The search service finds, ranks and returns a set of second search queries according to the first search query. The content management system may either automatically execute the top-ranked second search query and return search results of the top-ranked second search query or the content management system may return a set of second search queries to the search-base application program, which will then execute the top ranked one. The searched-based application program may use the results of the second search query to render the current view of the searched-based application program. The searched-based application program may rely on the ranking of the search results for selecting or sequencing content items, menu items, navigation elements, etc.

According to embodiments, the computer program product further comprises computer-readable program code configured to implement any of the embodiments of the method for implementing a user-driven adaptation of a ranking of navigation elements of a client application described herein.

According to embodiments, the computer system further is configured to execute any of the embodiments of the method for implementing a user-driven adaptation of a ranking of navigation elements of a client application described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
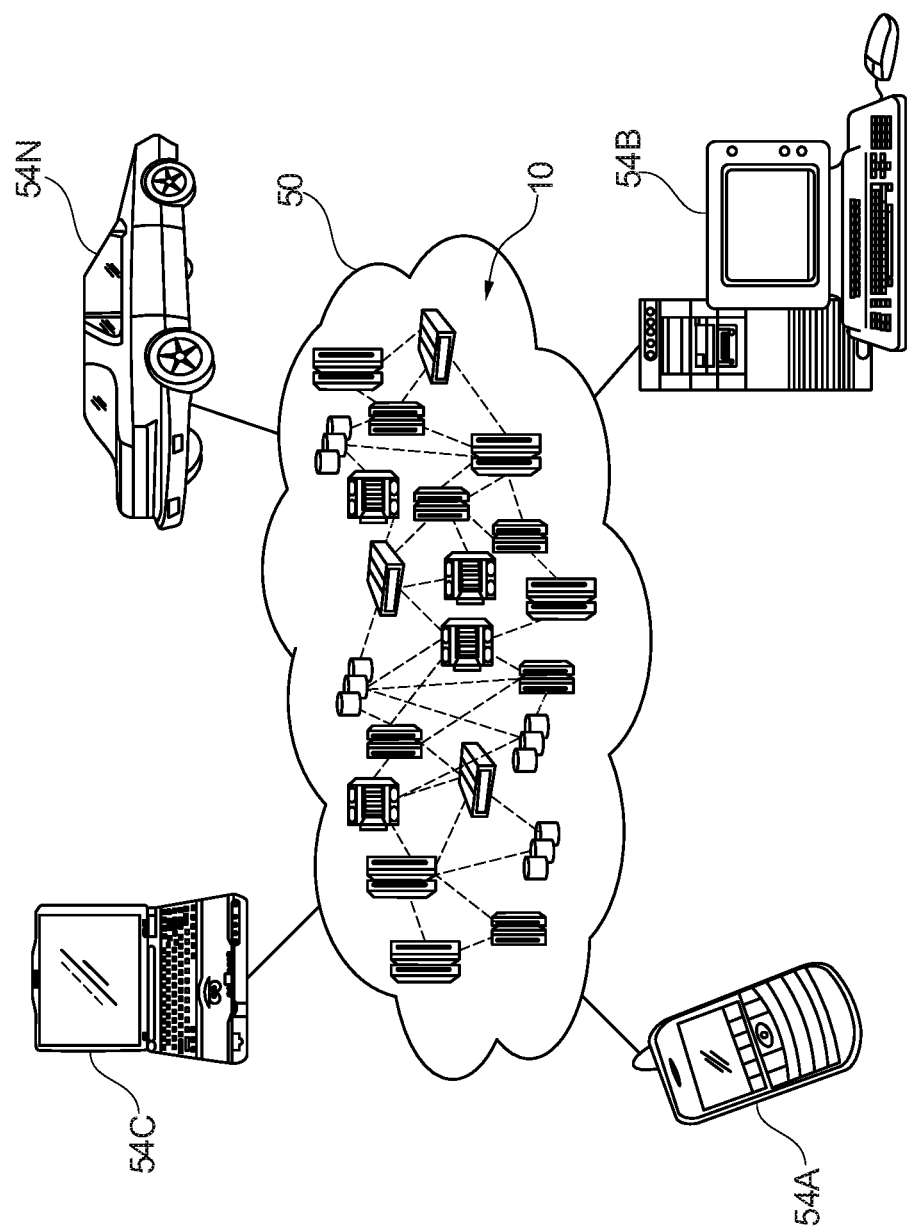
FIG. 2 depicts a schematic diagram illustrating an exemplary cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
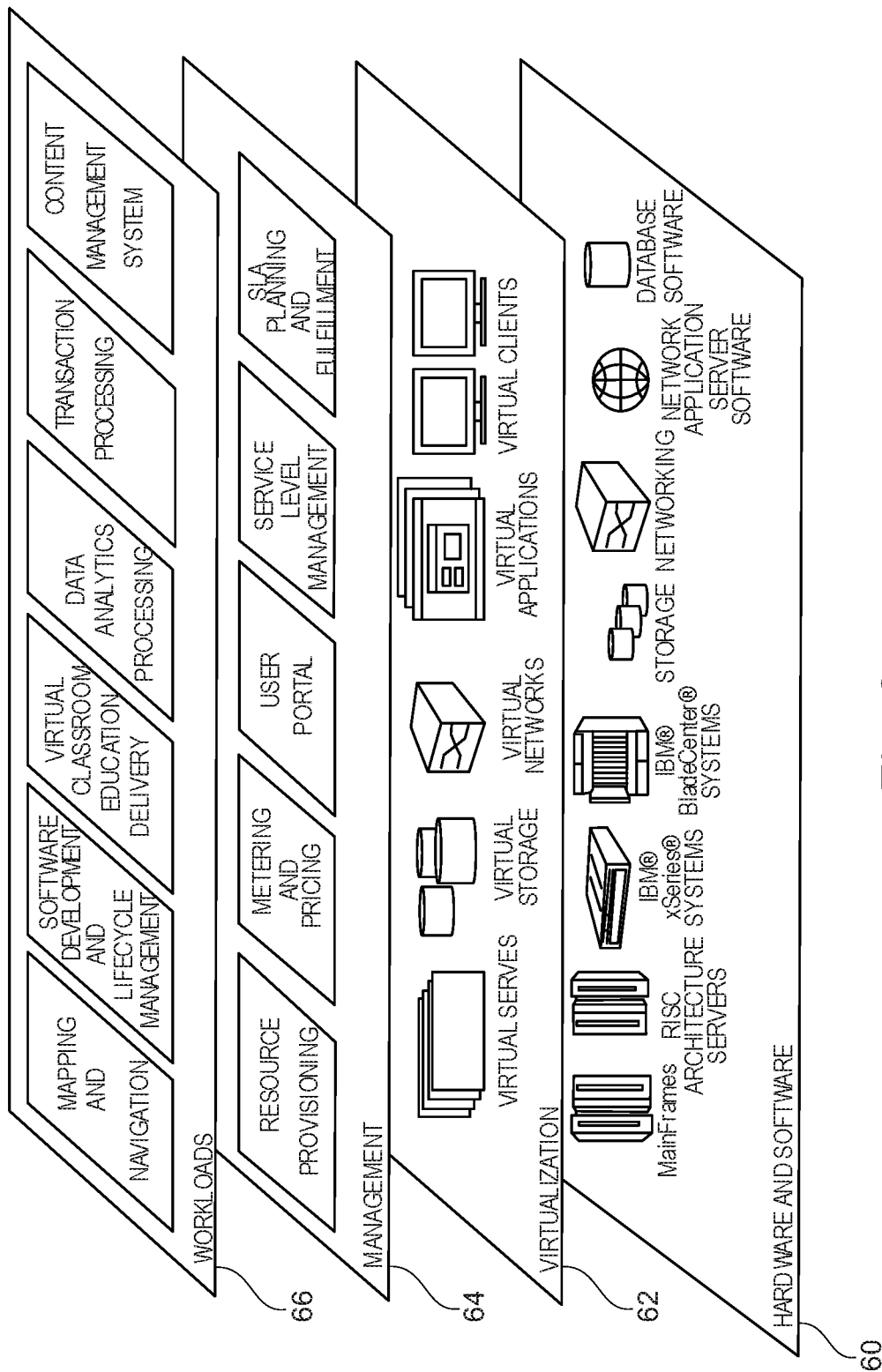
FIG. 3 depicts schematic diagram illustrating exemplary abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. For example, cloud storage locations, e.g. a virtual storage of virtualization layer 62, may be provided. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. For example, the identity of a user trying to access storage locations provided by the cloud infrastructure may be verified. User portal provides access to the cloud computing environment for consumers and system administrators, e.g. access to storage locations provided by the cloud infrastructure. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; a search service, e.g., provided as part of a content management system configured for automatically implementing one or more improved navigation paths between content items provided by the content management system.

Figure 4:
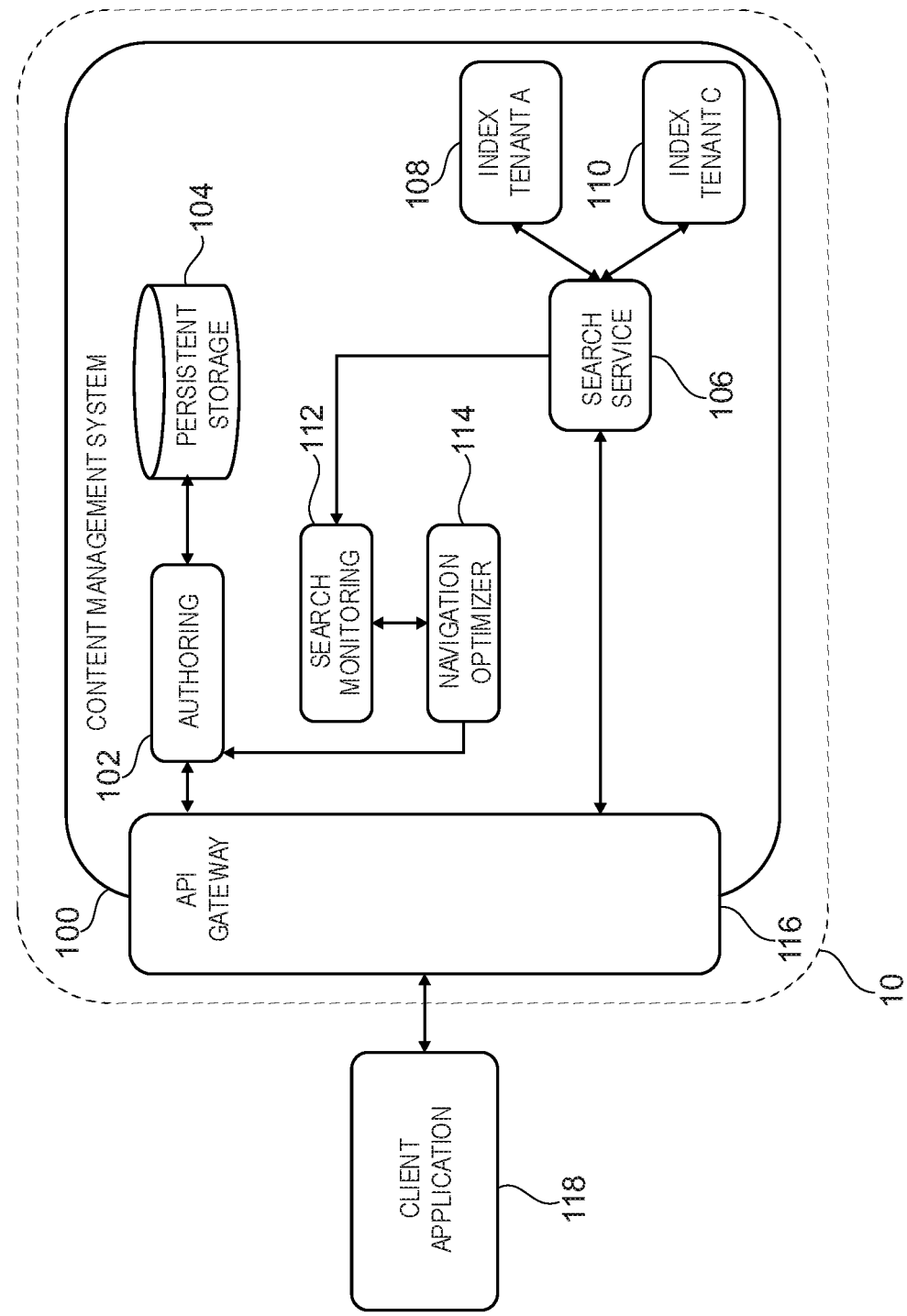
FIG. 4 depicts a schematic diagram illustrating an exemplary system for implementing improved navigation paths between content items.

FIG. 4 depicts a schematic diagram illustrating an exemplary system for implementing improved navigation paths between content items. The system may comprise a computer system, e.g. a cloud computing node 10, which provides a content management system 100. The content management system 100 manages digital content items, in particular a creation and modification of digital content items. Digital content items may, e.g., comprised text documents, web pages, images, videos, code scripts, etc. The content management system 100 comprises an authoring component 102 for creating, modifying and editing content items managed by the content management system 100 as well as a persistent storage 104 for storing the content items created, modified and/or edited by the authoring component 102.

The content management system 100 further comprises a search service 106. The search service 106 may provide a search engine, i.e., an information retrieval software program configured for information retrieval and presentation in response to search queries. The search engine is configured for searching one or more search indexes 108, 110 with content items managed by the content management system 100. The search indexes 108, 110 contain representations of data content to be searched. The representation may be configuring to improve processing of search queries. The content items comprised by the search indexes 108, 110 may, e.g., comprise navigation elements. The search indexes 108, 110 may be tenant specific search indexes 108, 110, i.e., assigned to specific tenants. Depending on which tenant requests a search, the search service 106 may select one of the search indexes 108, 110 assigned to the requesting tenant. The search is then executed by the search engine according to the request using the selected search index 108, 110.

The search service 106 further comprises a search monitoring component 112 configured for monitoring search queries issued by a client application 118 and received by the search service 106 via an API gateway 116. The monitoring component 112 is configured to pass each observed search query to a navigation optimizer component 114. The navigation optimizer component 114 receives the observed queries which represent search queries resembling the navigation behavior of a user of the client application. The navigation optimizer component 114 is configured to analyze the navigation history of the user represented by a sequence of application views which the client application retrieved for the user using the observed search queries. The navigation optimizer component 114 determines whether there are potential shortcuts between application views relevant for the user. For the determined shortcuts additional navigation paths are identified and implemented. For this purpose, additional navigation elements are provided enabling the user to use the shortcuts. Furthermore, search queries are modified to take into account the additional navigation elements.

A client application 124 in form of a search-based application may rely on the search service 106 of the content management system 100 to identify and retrieve contents, navigation information, site structures and/or page structures, etc. that is required for the functionality of the respective client application 118. For example, the client application may send during runtime a series of search queries via an API gateway to the search service 106. The search service 106 executes the search queries using one of the search indexes 108, 110 assigned to the user of the client application 118. Thus, the client application 118 is enabled of retrieving information required for rendering an application views from the search results received. Thus, the client application 124 may not require a database, file system or other persistency component for managing on its own.

Figure 5A:
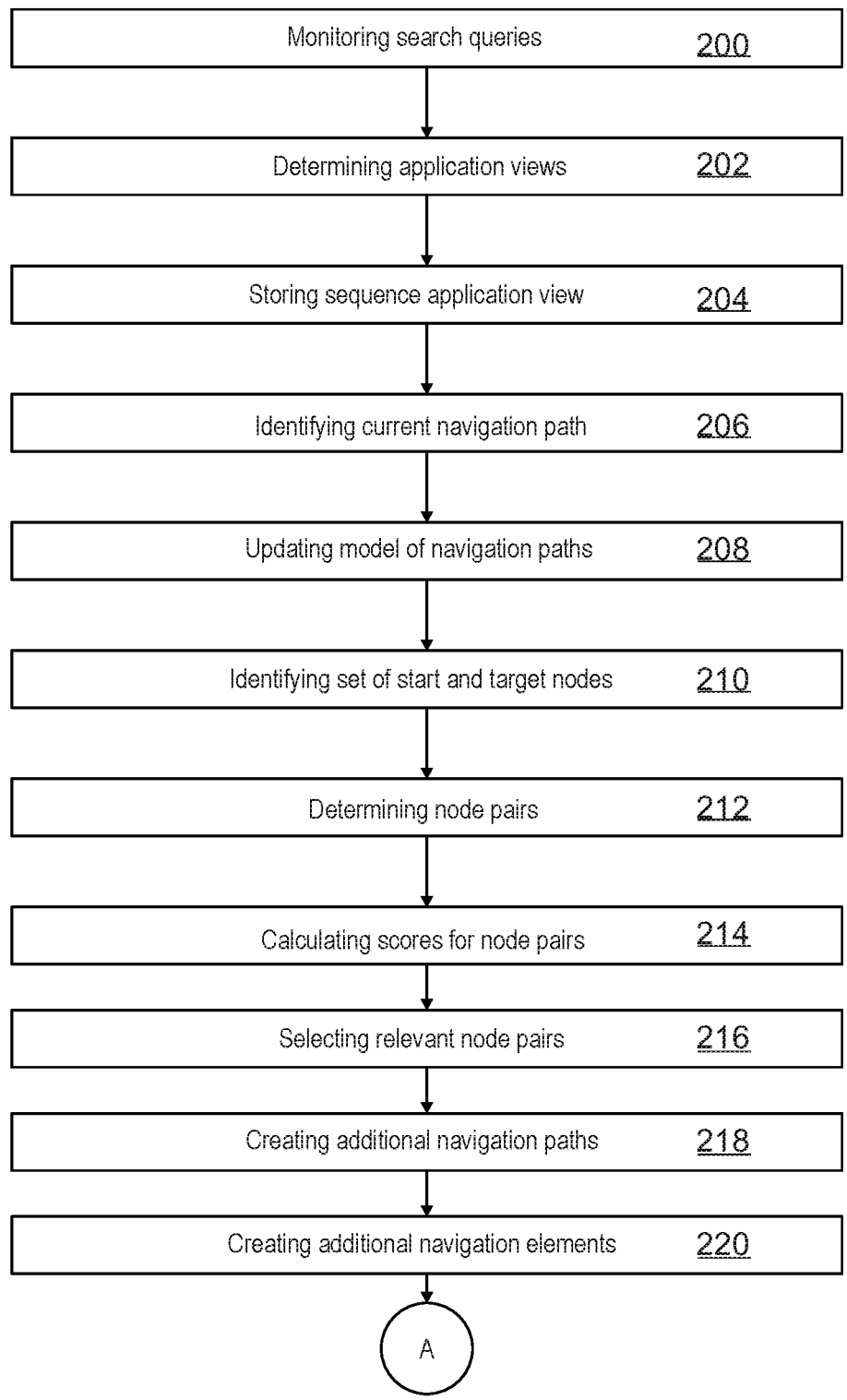
FIGS. 5A and 5B depict a schematic flow diagram of an exemplary method for implementing improved navigation paths between content items.
Figure 5B:
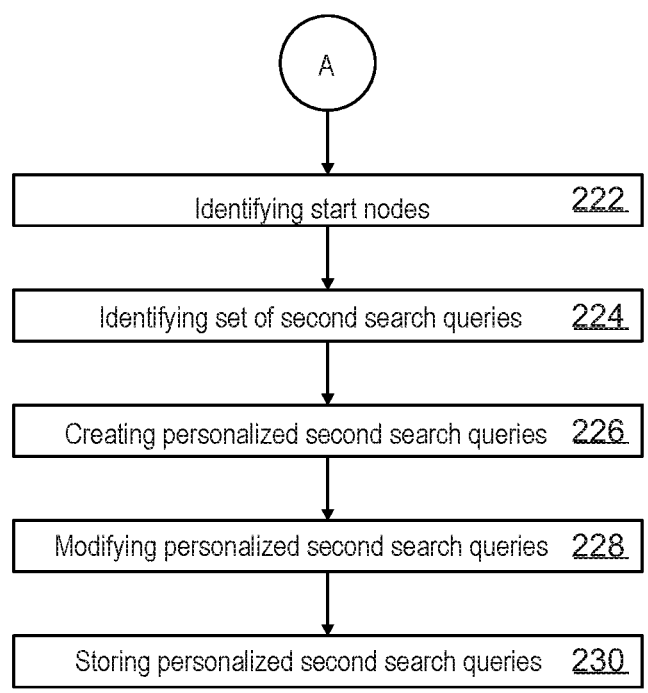
Figures 7, 8:
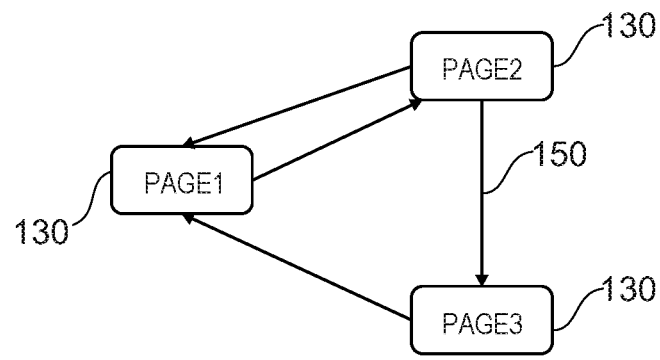
FIG. 7 depicts a schematic diagram illustrating an exemplary graph model of navigation paths.
FIG. 8 depicts a table illustrating an exemplary set of scored content item pairs.

FIGS. 5A and 5B depict a schematic flow diagram of an exemplary method for implementing improved navigation paths between content items. In block 200, first search queries issued by the search-based application and received by the search service are monitored. For this purpose, a search monitoring component (SMC) may be used which passes each observed search query to the navigation optimizer component (NOC). In block 202, the navigation optimizer component determines application views to which the search queries are assigned. The observed search queries received from the search monitoring component may comprise application view identifiers which are identified by the navigation optimizer component in order to determine the respective application views. The application view identifiers identify views of the search-based application. Using the application view identifiers, the navigation optimizer component may calculate a model of navigation paths representing navigation paths used by the user to navigate between multiple views of the application. The model of navigation paths may, e.g. be a directed graph like model as shown in FIG. 7. In FIG. 7 a schematic diagram is depicted illustrating an exemplary graph model of navigation paths. The content items are provided in form of application views or pages 130. Each page comprises one or more navigation elements configured to navigate to the other pages. For example, page 1 may comprise a navigation element implementing a link to page 2, page 2 may comprise two navigation elements implementing inks to page 1 and page 3. Page 3 may comprise a navigation element implementing a link to page 1. The respective links are represented by directed edges 150.

In block 204, the observed sequence of application views identifiers is stored by the navigation optimizer component. In block 206, a current navigation path leading to a current application view is identified by retrieving an identifier of a preceding application view visited last by the user in a current user session. In block 208, the model of navigation paths is updated with the current navigation path identified in block 206. In other words, if the navigation path found is not comprised by the model yet, the respective navigation path is added to the model and/or a model is created using the respective navigation path. In case of a directed graph like model as shown in FIG. 7, the updating may comprise providing a vertex representing a preceding application view, a vertex representing a current application view and a directed edge between both vertices, wherein the edge may be assigned with at least one metric representing how frequently the user navigated between both application views within a given timeframe. The navigation optimizer component may use the updates model of navigation paths to compute a set of optimized, i.e., shortened, navigation paths between application views based on a user's navigation history represented by the respective model. Each node of the model may represent a content item, like, e.g., an application view or page.

In block 210, the navigation optimizer component identifies a set of start nodes and a set of target nodes of existing navigation paths in a graph like model of navigation paths. In block 212, the navigation optimizer component determines a set of node pairs. Each pair of nodes comprises a start node and a target node. These nodes are not required to be directly connected by a single path, i.e. a single edge, in the graph like model. Each pair of nodes represents a potential additional direct navigation path between both nodes of the respective pair. In block 214, the navigation optimizer component calculates a score for each node pair. The score may indicate how relevant or helpful a corresponding potential additional direct navigation path would be for the user. The assessment of relevance or helpfulness may be performed according to one or more of the following criteria.

If the start node and the target node are already connected by an edge in the graph like model the score may be set=0. In this case, the respective direct navigation path is already implemented and used by the user. Thus, no additional benefits may be gained regarding this already established direct navigation path. The scoring may further consider how often a user visited the start node and target node, how long the user stayed in the application view represented by the start node and/or in the application view represented by the target node, and/or the kind of user interactions performed by the user with the application view represented by the start node and/or in the application view represented by the target node. For example, the score may include a factor proportional to the ratio of a number of user visits to the application view represented by the start node within a given timeframe to a number of user visits to the application view represented by the target node within the given timeframe.

The number of visits may comprise a number of interactions, e.g., each visit may be weighted by the number of interactions performed during the respective visit. The given timeframe taken into consideration may, e.g., be past 30 days. The score may further comprise a corresponding factor for the start node. The goal of the scoring may be to filter out irrelevant potential direct navigation paths. The scoring may further consider how many clicks the new direct navigation path would have saved the user in a given, i.e., predefined, timeframe, such as the past 30 days. The score may, e.g., comprise a factor proportional to the average length of all navigation paths the user used to navigate between the start node and the end node in the given timeframe.

Such scores for node pairs are illustrated in the table of FIG. 8. In FIG. 8 a table is depicted illustrating an exemplary set of scored content item pairs. For example, there are three nodes 1 to 3, for each potential pairing of nodes a score is calculated. In case, e.g., all pairings are already known except for node 1 as start node and node 3 as a target node, only this pair is assigned with a non-zero score depending on its relevance for the user.

In block 216, the navigation optimizer component selects a set of relevant node pairs. Relevant node pairs are, e.g., node pairs assigned with a score exceeding a predefined threshold. In block 218, the navigation optimizer component cerates for each selected node pair an additional direct navigation path between the start node and the target node of the respective pair. In block 220, the navigation optimizer component further creates for each of the resulting additional direct navigation paths an additional navigation element in form of a content item representing the respective additional direct navigation path. The creating of the additional navigation elements may further comprise creating additional navigation element identifiers. The additional direct navigation path may be assigned with a set of identifying keywords, e.g., the additionally created navigation element identifier identifying the additional direct navigation path. The creating of the additional navigation element identifier may e.g. comprise invoking an authoring service via an API. In block 222, the navigation optimizer component identifies an application view identifier of the starter node of each additional navigation path and in block 224 a set of second search queries comprising the respective application view identifier of the starter node of the additional navigation path. In block 226, the navigation optimizer component creates personalized version of each of the second search queries using the search query identifier of the respective second search query and an application view identifier of a non-personalized version of the respective second search query. Additionally, a user identifier of the user and optionally one or more user group identifier identifying user groups the respective user is assigned to may be added. In block 228, the navigation optimizer component modifies the content of the personalized version of the second search queries to including the additional navigation element identifier in the search query. In other words, the personalized versions of the second search queries are updated to additionally return the additional navigation element. According to embodiments, the additional navigation element identifier may comprise in a disjunctively connected subquery, such as "q= . . . OR id:<additional navigation element id>". In block 230, the modified personalized version of the second search query are stored in a search index of the search service. The storing may comprise invoking the authoring service API, which in turns indexes the personalized search query content item. After completion, the search-based application program may automatically retrieve and display the additional navigation elements without requiring code changes or content author actions.

FIGS. 6A and 6B depict schematic diagrams illustrating exemplary application views 130 of the client application. FIG. 6A shows a set of application views 130 before an additional navigation element is added, while FIG. 6B shows the set after the additional navigation element has been added. Each view 130 represents a page displayed on a user interface of the client application comprising content 132 as well as one or more navigation elements 134 to navigate between the respective views 130. For example, there are three view "page 1", "page 2", and "page 3" as shown in FIG. 6A. Since page 1 only comprises a navigation element 134 to navigate to page 2, in order to retrieve page 3 a user first has to navigate to page 2. This may be inefficient, in case the user is in general more interested in the content 132 provided by page 3 than the one provided by page 2. Thus, the navigation behavior of the user may be analyzed and an additional direct navigation path from page 1 to page 3 created. This may result in an additional navigation element 134 add to page 1 as shown in FIG. 6B. The additional navigation element 134 provides a direct link, i.e., navigation path, from page 1 to page 3. Thus, the user is enabled to navigate from page 1 directly to page 3 without a requirement to first retrieve page 2.

It is understood that one or more of the aforementioned embodiments of the invention may be combined as long as the combined embodiments are not mutually exclusive. Ordinal numbers, like e.g. 'first' and 'second', are used herein to indicate different element assigned with the same name, but do not necessarily establish any order of the respective elements.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for automatically implementing one or more improved navigation paths between content items, the method comprising the steps of:
   monitoring, by one or more computer processors, a first search query;
   determining, by one or more computer processors, a set of navigation paths used by a user for navigation between the content items searched for by the monitored first search query;
   determining, by one or more computer processors, a set of start content items and a set of target content items, wherein each of the start content items is linked with at least one of the target content items by a sequence of one or more of the determined navigation paths;
   determining, by one or more computer processors, a set of content item pairs, wherein each content item pair comprises a start content item from the set of start content items and a target content item from the set of target content items linked with the respective start content item;
   assigning, by one or more computer processors, each content item pair of the set of content item pairs with a score identifying a relevance of the respective content item pair for the user;
   creating, by one or more computer processors, a set of one or more improved navigation paths, the set of improved navigation paths comprises an additional navigation path for each content item pair with the score exceeding a first predefined threshold, wherein the respective additional navigation path directly links the start content item and target content item of the respective content item pair;

assigning, by one or more computer processors, each of the additional navigation paths to be provided to the client application for display as part of first search query results of the first search query, wherein the method further comprises creating for each of the additional navigation paths an additional navigation element representing the respective additional navigation path;

storing, by one or more computer processers, the additional navigation elements as additional content items in a search index of a search service, wherein the additional content items each comprise one or more keywords identifying the respective additional content item executing, by one or more computer processors, a respective first search query of the first search query of the plurality of first search query issued by the client application;

providing, by one or more computer processors, as a first search result of the respective first search query one or more second search query comprising the one or more keywords referred to by a boosting factor of the respective first search query, wherein each of the second search query is stored as a content item in the search index comprising one or more keywords identifying the respective second search query;

executing, by one or more computer processors, the one or more second search query provided as the first search result;

providing, by one or more computer processors, second search results of the executed one or more second search query to the client application to be used as a search result for the executed first search query wherein the method further comprises for each additional navigation path:

identifying, by one or more computer processors, each second search query comprising an identifier of a start content item of the respective additional navigation path;

creating, by one or more computer processors, a personalized version of each of the identified second search query, wherein the personalized versions of the identified second search query each comprise an additional navigation element identifier of the respective additional navigation path and are assigned to the user for which the respective second search query is personalized, storing, by one or more computer processors, the personalized versions of the identified second search query in the search index.

2. The computer-implemented method of claim 1, wherein the determining of the set of navigation paths comprises analyzing a temporal sequence in which the monitored first search query are received.

3. The computer-implemented method of claim 2, wherein the determining of the navigation paths comprises considering each first search query of the temporal sequence except for an initial first search query of the temporal sequence, determining a first search query directly preceding the considered first search query and identifying a navigation path, wherein the identified navigation path starts with a content item search for the first search query directly preceding the considered first search query and ends with a content item searched for the considered first search query.

4. The computer-implemented method of claim 1, wherein the content items are application view identifiers identifying views search for by the first search query in order to be displayed by a client application.

5. The computer-implemented method of claim 1, wherein the set of navigation paths represents a directed graph of the navigation paths, each navigation path comprising a first vertex representing the start content item, a second vertex representing the target content item and a least directed edge connecting the first vertex and the second vertex.

6. The computer-implemented method of claim 1, wherein the additional navigation path directly linking a start and a target content item is a navigation path comprising a single directed edge connecting a first vertex representing the start content item and a second vertex representing the target content item.

7. The computer-implemented method of claim 1, wherein each content item pair represents a potential additional navigation path directly linking the two content items of the respective content item pair.

8. The computer-implemented method of claim 1, wherein the method further comprises updating the set of navigation paths with the additional navigation paths.

9. The computer-implemented method of claim 1, wherein the calculation of the score identifying the relevance of the respective content item pair takes into account one or more of the following: how often the user used the individual content items of the respective content item pair, how long the user used the individual content items of the respective content item pair, how the user used the individual content items of the respective content item pair, and how may user interactions in a given timeframe are saved by the additional navigation path linking the two content items directly relative to a number of user interaction required for navigating between the respective content item pair using a combination of navigation paths requiring already comprised by the set of navigations paths and currently requiring a smallest number of interaction.

10. The computer-implemented method of claim 1, wherein the additional navigation elements each represent a link to be presented by the client application with the start content item of the additional navigation path and provide a navigation tool to directly navigate to the target content item.

11. The computer-implemented method of claim 1, wherein the additional navigation element identifier is included in a disjunctively connected subquery comprised by each personalized version of the identified second search query.

12. The computer-implemented method of claim 1, wherein each personalized version of the identified second search query comprises a search query identifier and the identifier of the start content item of the non-personalized version of the respective identified second search query, wherein the personalized version of the respective identified second search query further comprises a user identifier identifying the user for which the respective personalized version of the respective identified second search query is personalized.

13. The computer-implemented method of claim 1, wherein the boosting factor of the first search query comprises a user identifier of a user as a keyword for identifying the personalized version of a second search query comprising the user identifier, wherein the second search result provided as a second search result of the personalized version of a second search query comprises the additional navigation element representing the additional navigation path, and wherein the using of the second search result by the client application as a search result for the issued first search query comprises displaying the respective additional navigation element.

14. A computer program product for automatically implementing one or more improved navigation paths between content items, the computer program product comprising:
one or more computer readable storage media; and
program instructions stored on the one or more computer readable storage media, the program instructions comprising:
program instructions to monitor a first search query;
program instructions to determine a set of navigation paths used by a user for navigation between the content items searched for by the monitored first search query;
program instructions to determine a set of start content items and a set of target content items, wherein each of the start content items is linked with at least one of the target content items by a sequence of one or more of the determined navigation paths;
program instructions to determine a set of content item pairs, wherein each content item pair comprises a start content item from the set of start content items and a target content item from the set of target content items linked with the respective start content item;
program instructions to assign each content item pair of the set of content item pairs with a score identifying a relevance of the respective content item pair for the user;
program instructions to create a set of one or more improved navigation paths, the set of improved navigation paths comprises an additional navigation path for each content item pair with the score exceeding a first predefined threshold, wherein the respective additional navigation path directly links the start content item and target content item of the respective content item pair;
program instructions to assign each of the additional navigation paths to be provided to the client application for display as part of first search query results of the first search query, wherein the program instructions further comprises creating for each of the additional navigation paths an additional navigation element representing the respective additional navigation path;
program instructions to store the additional navigation elements as additional content items in a search index of a search service, wherein the additional content items each comprise one or more keywords identifying the respective additional content item
program instructions to execute a respective first search query of the first search query of the plurality of first search query issued by the client application;
program instructions to provide as a first search result of the respective first search query one or more second search query comprising the one or more keywords referred to by a boosting factor of the respective first search query, wherein each of the second search query is stored as a content item in the search index comprising one or more keywords identifying the respective second search query;
program instructions to execute the one or more second search query provided as the first search result;
program instructions to provide second search results of the executed one or more second search query to the client application to be used as a search result for the executed first search query wherein the program instructions further comprises for each additional navigation path:
program instructions to identify each second search query comprising an identifier of a start content item of the respective additional navigation path;
program instructions to create a personalized version of each of the identified second search query, wherein the personalized versions of the identified second search query each comprise an additional navigation element identifier of the respective additional navigation path and are assigned to the user for which the respective second search query is personalized, program instructions to store the personalized versions of the identified second search query in the search index.

15. A computer system for automatically implementing one or more improved navigation paths between content items, the computer system comprising:
one or more computer processors;
one or more computer readable storage media; and
program instructions stored on the one or more computer readable storage media for execution by at least one of the one or more computer processors, the program instructions comprising:
program instructions to monitor a first search query;
program instructions to determine a set of navigation paths used by a user for navigation between the content items searched for by the monitored first search query;
program instructions to determine a set of start content items and a set of target content items, wherein each of the start content items is linked with at least one of the target content items by a sequence of one or more of the determined navigation paths;
program instructions to determine a set of content item pairs, wherein each content item pair comprises a start content item from the set of start content items and a target content item from the set of target content items linked with the respective start content item;
program instructions to assign each content item pair of the set of content item pairs with a score identifying a relevance of the respective content item pair for the user;
program instructions to create a set of one or more improved navigation paths, the set of improved navigation paths comprises an additional navigation path for each content item pair with the score exceeding a first predefined threshold, wherein the respective additional navigation path directly links the start content item and target content item of the respective content item pair;
program instructions to assign each of the additional navigation paths to be provided to the client application for display as part of first search query results of the first search query, wherein the program instructions further comprises creating for each of the additional navigation paths an additional navigation element representing the respective additional navigation path;
program instructions to store the additional navigation elements as additional content items in a search index of a search service, wherein the additional content items each comprise one or more keywords identifying the respective additional content item
program instructions to execute a respective first search query of the first search query of the plurality of first search query issued by the client application;
program instructions to provide as a first search result of the respective first search query one or more second search query comprising the one or more keywords referred to by a boosting factor of the respective first search query, wherein each of the second search query is stored as a content item in the search index comprising one or more keywords identifying the respective second search query;

program instructions to execute the one or more second search query provided as the first search result;

program instructions to provide second search results of the executed one or more second search query to the client application to be used as a search result for the executed first search query wherein the program instructions further comprises for each additional navigation path:

program instructions to identify each second search query comprising an identifier of a start content item of the respective additional navigation path;

program instructions to create a personalized version of each of the identified second search query, wherein the personalized versions of the identified second search query each comprise an additional navigation element identifier of the respective additional navigation path and are assigned to the user for which the respective second search query is personalized, program instructions to store the personalized versions of the identified second search query in the search index.

* * * * *